United States Patent
Sarkisian et al.

(10) Patent No.: US 9,546,293 B2
(45) Date of Patent: Jan. 17, 2017

(54) FLUID SETS FOR PRINTING

(71) Applicant: Hewlett-Packard Development Company, L.P., Fort Collins, CO (US)

(72) Inventors: George Sarkisian, San Diego, CA (US); Ali Emamjomeh, San Diego, CA (US); Elizabeth Ann Visnyak, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/430,183

(22) PCT Filed: Sep. 25, 2012

(86) PCT No.: PCT/US2012/057094
§ 371 (c)(1),
(2) Date: Mar. 20, 2015

(87) PCT Pub. No.: WO2014/051547
PCT Pub. Date: Apr. 3, 2014

(65) Prior Publication Data
US 2015/0252205 A1  Sep. 10, 2015

(51) Int. Cl.
*C09D 11/40* (2014.01)
*C09D 11/10* (2014.01)
*C09D 11/03* (2014.01)
*C09D 11/107* (2014.01)
*C09D 11/54* (2014.01)
*C09D 11/322* (2014.01)
*B41M 5/00* (2006.01)
*B41M 3/00* (2006.01)

(52) U.S. Cl.
CPC ............ *C09D 11/40* (2013.01); *B41M 5/0017* (2013.01); *C09D 11/03* (2013.01); *C09D 11/10* (2013.01); *C09D 11/107* (2013.01); *C09D 11/322* (2013.01); *C09D 11/54* (2013.01); *B41M 3/008* (2013.01)

(58) Field of Classification Search
None
See application file for complete search history.

(56) References Cited

U.S. PATENT DOCUMENTS

| 6,906,019 | B2 | 6/2005 | Nitzan et al. |
| 7,033,013 | B2* | 4/2006 | Koyano ............... B41M 5/0017 347/100 |
| 8,118,424 | B2 | 2/2012 | Irita |
| 2008/0092309 | A1 | 4/2008 | Ellis et al. |
| 2008/0118657 | A1* | 5/2008 | Taverizatshy .......... C09D 11/38 427/466 |
| 2010/0231671 | A1 | 9/2010 | Anton et al. |
| 2010/0293725 | A1 | 11/2010 | Hermann |
| 2010/0295891 | A1 | 11/2010 | Goto |
| 2011/0293898 | A1 | 12/2011 | Yatake et al. |
| 2011/0304661 | A1 | 12/2011 | Emamjomeh et al. |
| 2012/0128949 | A1 | 5/2012 | Goto |

FOREIGN PATENT DOCUMENTS

WO  2011159371  12/2011
WO  WO 2011159371 A1 *  12/2011

OTHER PUBLICATIONS

International Search Report and Written Opinion dated Apr. 29, 2013 for International Application No. PCT/US2012/057094 filed Sep. 25, 2012, Applicant Hewlett-Packard Development Company, L.P. et al.

* cited by examiner

*Primary Examiner* — An Do
*Assistant Examiner* — Renee I Wilson
(74) *Attorney, Agent, or Firm* — Thorpe, North & Western L.L.P.

(57) ABSTRACT

The present disclosure sets forth a fluid set and a method of wet-on-wet printing. The fluid set can comprise an analog pretreatment fluid including water, latex, and a salt; and a first and second inkjet ink each comprising water, pigment, a solvent system, and a surfactant system. The analog pretreatment fluid can be prepared to have a surface tension from 32 dynes/cm to 40 dynes/cm. The first inkjet ink can have a surface tension ranging from 2 dynes/cm greater than the surface tension of the analog fixer fluid to 6 dynes/cm less than the surface tension of the analog fixer fluid. Likewise, the second inkjet ink can have a surface tension ranging from 2 dynes/cm greater than the surface tension of the analog fixer fluid to 6 dynes/cm less than the surface tension of the analog fixer fluid.

20 Claims, No Drawings

FLUID SETS FOR PRINTING

BACKGROUND

There are many approaches that have been used for digitally print on various types of media. Aqueous inks have typically been used for inkjet printing on porous media, and non-aqueous inks have often been used for printing on offset media. However, this is not always the case. Techniques of printing aqueous inks on offset media or other hold out media have also been developed to varying degrees of success. High hold out media, which is a smooth media that does not readily absorb ink (particularly aqueous ink), can be a challenge for digital printing technologies, particularly for aqueous inkjet printing inks. Fixers, for example, can be applied to the surface of the media in order to provide composition for the ink to become fixed. However, there can be problems even with this approach. For example, when an ink is printed on the media surface coated with a fixer, the first layer of ink may be applied accurately and effectively, but often, subsequently applied inks printed on top of previously applied ink layers do not benefit from the presence of the fixer to as great of a degree. Thus, it would be an advancement in the art to develop fluid sets that can be used to print multi-layered inks accurately with improved image quality, color gamut, grain, and/or optical density.

DETAILED DESCRIPTION

Various types of media including high hold out media, e.g., offset media and coated offset media, can pose print quality problems for many high speed aqueous inkjet printing inks. One approach to solving this problem is to use an analog pretreatment fluid that is applied to the surface of the media substrate. The term "analog" is used to describe coating fluids that are not typically appropriate for application using digital inkjet printing technologies, but which can be applied using more standard coating operations, e.g., roll coating, spray coating, curtain coating, blade coating, slot die coating, etc. The application of analog pretreatment fluid, which primes media substrate before inks are digitally jetted thereon, can provide bleed and coalescence control and greatly improve image durability.

However, other printing problems can be introduced when printing a first inkjet ink on a pretreatment fluid, and then overprinting a second inkjet ink on the previously applied first inkjet ink. This is particularly the case for wet-on-wet printing, where the analog pretreatment fluid, the first inkjet ink, and the second inkjet ink (and other subsequently applied inks) are all printed on top of one another while each fluid is still wet. To illustrate, the first ink drop from the first inkjet ink that is printed on a wet analog pretreatment fluid forms a wet fluid mixture that has a different surface than the analog pretreatment fluid that was first applied. Thus, subsequent drops of inks that are applied to the analog pretreatment fluid/first inkjet ink mixture are applied to a surface (the mixture) that has a different starting surface tension than the analog pretreatment fluid as originally applied. Thus, the second and any subsequently applied inkjet inks have an impacted dot gain (the subsequently applied ink drop typically does not spread as much) that different enough from the first layer of inkjet ink that is applied that the printing quality can be reduced. In other words by example, a wet analog pretreatment fluid applied to a media substrate may have a surface tension of X dynes/cm. When a first inkjet ink is applied having a surface tension of Y dynes/cm to the wet analog pretreatment fluid, the mixture will have a surface tension somewhere between X and Y dynes/cm. Thus, when a second (or other subsequent) inkjet ink is applied to the mixture of pretreatment fluid and first inkjet ink, the starting surface tension of the "substrate" (which now comprises the mixture) is different than when the first ink is applied. This small difference in surface tension can have a large impact on dot gain (or ink drop spreading) on a layer by layer basis.

In recognizing this problem and studying this effect, it has been further recognized that the relationship between surface tension of the analog pretreatment fluid and multiple subsequently applied layers of inkjet ink can be carefully controlled to retain a more consistent dot gain from layer to subsequent layer of inkjet ink, while at the same time, increasing overall dot gain, i.e. more consistent spreading as well as increased total spreading. This can be accomplished by keeping the surface tension of the inks about the same as, or even slightly lower than the surface tension of the analog pretreatment fluid so that the ink wicks appropriately when printing the first ink layer, and further, so that subsequently applied inks still have a similar or even slightly lower surface tension than the mixture of analog pretreatment fluid and earlier layers of ink. If the ink set is not formulated in this manner, subsequently applied ink layers may not spread as well on previously applied ink layers, leading to more drastic drops in dot gain, which can be problematic with respect to image quality. Specifically, the loss in dot gain of subsequently applied ink drops can affect the color gamut, grain, and optical density of the print.

Thus, in accordance with examples of the present disclosure, a unique fluid set has been prepared that provides a solution to printing aqueous inks on media, such as even high hold out media, and provides more consistent dot gain from layer of ink to layer, as well as an increase in average dot gain.

More specifically, a fluid set can comprise an analog pretreatment fluid including water, latex, and a salt; a first inkjet ink comprising water, a first pigment, a first solvent system, and a first surfactant system; and a second inkjet ink including water, a second pigment, a second solvent system, and a second surfactant system. The analog pretreatment fluid can be prepared to have a surface tension from 32 dynes/cm to 40 dynes/cm.

In another example, a method of wet-on-wet printing can comprise steps of applying an analog pretreatment fluid to a media substrate by a method other than digital inkjet printing to form a coated media sheet, digitally inkjet printing a first inkjet ink on the coated media sheet while the pretreatment fluid is still wet, and digitally inkjet printing a second inkjet ink on the first inkjet ink while the analog pretreatment fluid and the first inkjet ink are still wet.

In both the fluid set and the method examples above, the first inkjet ink can have a surface tension ranging from 2 dynes/cm greater than the surface tension of the analog fixer fluid to 6 dynes/cm less than the surface tension of the analog fixer fluid. Likewise, the second inkjet ink can have a surface tension ranging from 2 dynes/cm greater than the surface tension of the analog fixer fluid to 6 dynes/cm less than the surface tension of the analog fixer fluid. In a more specific embodiment, the first inkjet ink can have a surface tension ranging from 2 to 6 dynes/cm less than the surface tension of the analog fixer fluid, and the second inkjet ink can have a surface tension ranging from 2 to 6 dynes/cm less than the surface tension of the analog fixer fluid. Furthermore, in an even more specific example, these values can be modified independently to from 2.5 to 4.5 dynes/cm.

In further detail, the analog pretreatment fluid, the first inkjet ink, the second inkjet ink, and optionally any other inkjet inks in the fluid set can be formulated to have certain properties with respect to dot gain, as described herein in greater detail in the Examples. For example, upon digitally inkjet printing the first inkjet ink at a 10% fill volume on the analog pretreatment fluid to generate a first sample, and upon digitally printing the first inkjet ink at a 10% fill volume on the second inkjet ink at 100% coverage after printing the second inkjet ink on the analog pretreatment fluid to generate a second sample, the dot gain of the first inkjet ink on the first sample and the dot gain of the first inkjet ink on the second sample has an average coverage size of at least 28% and a difference in dot size of less than 7% coverage. In one specific example, the dot gain of the first inkjet ink on the first sample and the dot gain of the first inkjet ink on the second sample may even have a difference in dot size of less than 5% coverage.

It is noted that when discussing the present fluid sets and methods, each of these discussions can be considered applicable to each of these embodiments, whether or not they are explicitly discussed in the context of that embodiment. Thus, for example, in discussing a pigment in an inkjet ink of the fluid set, such a pigment can also be used in the method, and vice versa.

Turning now to certain exemplary compositional components that can be present in the fluid set, the analog pretreatment fluid will be described first, followed by the inkjet ink compositions.

Regarding the analog pretreatment fluid, there are several components that can be included therein, including water, latex, and a salt. Other optional components can also be included. Typically, a relatively high concentration of latex solids and salt within the same composition make this composition essentially unjettable through typical inkjet architecture. This is primarily because salts and latexes tend to interact and clog inkjet architecture, and because the high concentrations of latexes and salts tend to make the viscosity of these analog pretreatment fluids relatively high. Thus, the analog pretreatment fluid is applied, as described, by analog (non-digital) methods, e.g., roller, spray, curtain, knife, slot die, etc. It is noted that because these analog pretreatment fluids are applied using more traditional coating techniques, it is often practical to coat the entire side of a media substrate from edge to edge, though this is not required.

Regarding the water, the analog pretreatment fluid is typically an aqueous fluid, as it is typically formulated to receive aqueous inkjet inks. Thus, the water can be present at from 20 wt % 80 wt % in one example, from 30 wt % to 70 wt % in another example, and from 40 wt % to 60 wt % in yet another example. As mentioned briefly to above, major components of latex solids and salts can primarily help determine how much water may be present.

Turning now to the latex present in the analog pretreatment fluid, it is noted that the latex can be present in one example at from 20 wt % to 50 wt % by solids, in another example, the latex can be present at from 25 wt % to 40 wt % by solids. A latex, by definition, includes both solid polymer content and water. Thus, the term "latex solids" or "latex particulates" refers to discrete polymeric masses dispersed in the water (and other optional fluids). However, when the latex is admixed as part of the analog pretreatment fluid, the water and other liquid components become part of the fluid, and thus, the latex solids are often described for convenience. This is why the weight percentage of latex solids is provided herein. Furthermore, it is noted that the term "fluid" is defined herein to include both liquid solutions as well as liquid dispersions. Thus, the analog pretreatment fluid is considered a "fluid," even though it includes dispersed solids and is relatively viscous compared to the inkjet inks. Likewise, the inkjet inks described herein can include pigments, which are also solids. However, as defined herein, these inks are also considered to be "fluids."

In further detail regarding the latexes of the present disclosure, the monomers used in the latexes can be vinyl monomers. The monomers can be acrylate monomers, methacrylate monomers, styrene monomers, or combinations thereof. In others example, the monomers can be ethylene, vinyl chloride, vinylidene chloride, maleate esters, fumarate esters, itaconate esters, isocyanates, hydroxyl-containing monomers, and combinations thereof. Additionally, the monomers can include hydrophilic monomers including acid monomers or hydrophobic monomers.

More specific monomers that can be polymerized in forming the latex particulates include, without limitation, styrene, p-methyl styrene, a-methyl styrene, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, isocyanates, hydroxyl-containing monomers, derivatives thereof, and combinations thereof.

Acidic monomers that can be polymerized in forming the latex particulates include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, derivatives thereof, and combinations thereof.

Alternatively, the latex can be a polyurethane latex or urethane latex, such as an acrylic urethane polymer or similar hybrid polymer, polymer blend, or mixture. One example of a specific acrylic urethane polymer is Luciden® 645.

The latex particulates or solids can have various molecular weights, particle sizes, glass transition temperatures, etc. In one example, the latex particulates may have a weight average molecular weight ($M_w$) of about 50,000 to about 1,000,000. In another aspect, the latex particulates can have a weight average molecular weight ($M_w$) ranging from about 200,000 to about 400,000. Further, the average particle diameter of the latex particles can be from about 10 nm to about 1 μm; in some other examples, from about 10 nm to about 500 nm; and, in yet other examples, from about 100 nm to about 300 nm. The particle size distribution of the latex is not particularly limited, and either latex having a broad particle size distribution or latex having a mono-dispersed particle size distribution may be used. It is also possible to use two or more types of latex particles, each having a mono-dispersed particle size distribution in combination. Furthermore, latexes can be selected that provide durability to the printed ink, and which readily film form, e.g., latexes having a glass transition temperature from −22° C. to +110° C. Tg have been found to be effective for film formation in certain examples.

Regarding the salts that can be selected for use, the salt is primarily included to fix the pigment when the ink is printed thereon. In other words, the salts can be used to chemically attract and crash with the pigment on the media, preventing color bleed and minimizing color coalescence (mottle). Calcium and magnesium salts are effective for use, such as calcium nitrate tetrahydrate and and calcium chloride, though other salts also work well, e.g., calcium propionate, calcium acetate, magnesium sulfate, magnesium nitrate, magnesium acetate, etc. The salt, by solids, can be present in the analog pretreatment fluid at from 3 wt % to 20 wt %, or from about 5 wt % to 15 wt %, though these ranges are not intended to be limiting.

Other optional components that can be present include surfactant, defoamer, thickener, preservative/biocide, or the like. To illustrate a formulation where some of these compounds work together to provide an acceptable analog pretreatment fluid, one can consider a pigmented ink for use therewith for exemplary purposes. Once the ink is fixed to the analog pretreatment fluid, the latex serves to encapsulate or trap the colorant and form a protective layer. In this example, the latex includes a hydrophobic component that is pushed to the surface of the image and forms a protective layer. An associative thickener, such as Rheolate® 212, Optiflo® H370, Optiflo® TVS, Optiflo® L1400, etc., can be used to maintain a high viscosity to slow the penetration of the ink fluid into the media. Furthermore, the surfactant or surfactant mixtures can be used to increase the surface tension of the analog pretreateament fluid relative to the ink, thereby enhancing wetability. The defoamer can be used to provide foam control under the high shear conditions of roll coating or other analog coating technique. Furthermore, the biocide can act as a preservative for the coating composition. Often, once all of the ingredients are included, the analog pretreatment fluid can have a viscosity ranging from 100 to 300 cps in one example, and from 150 to 200 cps in another example. As previously mentioned the surface tension can likewise be from about 32 to about 40 dynes/cm.

Turning now to the inkjet ink compositions of the fluid sets of the present disclosure, as mentioned, the inks can include water, pigment, a solvent system, and a surfactant system. It is noted that the solvent system can be one solvent, but typically includes multiple solvents. Likewise, the surfactant system can be a single surfactant, but can also include multiple surfactants. Because the surface tensions are controlled to a very narrow range, it can be advantageous to use multiple solvents and/or surfactants. For example, there may be a solvent added that provides one benefit, e.g., acceptable co-solvent with water, and a second solvent is provided that provides a second benefit, e.g., improved decap properties. Likewise, some surfactants can be used to bring the ink to an acceptable range, and a second surfactant can be used to stabilize the system within the system as a whole. To illustrate, one surfactant may assist in providing an acceptable ink surface tension, but will not remain soluble within the ink or will separate once printed on the analog pretreatment fluid without the presence of a second surfactant. That being said, it is noted that any inkjet ink that can be prepared that includes water, a pigment, a solvent, and a surfactant that meets the criteria described herein can be used. However, a more careful formulation process may typically be used because of the relatively tight fluid set tolerances described herein.

As mentioned, specifically, the surface tension of the inkjet inks can range from 2 dynes/cm greater than the surface tension of the analog fixer fluid to 6 dynes/cm less than the surface tension of the analog fixer fluid. Alternatively, the surface tension of the inkjet inks can be from 2 to 6 dynes/cm lower than the surface tension of the analog pretreatment fluid. In other examples, the inkjet inks can be from 2.5 to 4.5 dynes/cm lower than the surface tension of the analog pretreatment fluid. In further detail, every inkjet ink in the fluid set meets one or more of these surface tension profiles so that any ink can be printed first, second, third, etc., without running into the problem of a printed layer having a lower surface tension than the subsequently applied ink.

The viscosity of the inkjet inks can be suitable for digital inkjet printing, ranging from 1 cps to 5 cps, but in one specific example, the viscosity of one or more of the inkjet inks can be from 1 to 2 cps.

The pigment can be present in any of the inkjet inks at from 0.5 wt % to 6 wt %, but are more typically present at from 1 w % to 4 wt %. As use herein, "pigment" generally includes pigment colorants, magnetic particles, aluminas, silicas, and/or other ceramics, organo-metallics, or other opaque particles. In typical one example, the pigment can be a colorant. Furthermore, the ink can include an anionic pigment dispersion, which can be a self-dispersed pigment, or a pigment with an unmodified surface that is dispersed by a separate dispersing agent, e.g., an anionic surfactant or a polymeric dispersant.

In one specific example, inks for use with the analog pretreatment fluid are typically anionic in nature. Thus, as used herein, "anionic" refers to inks containing pigment dispersions containing ionic dispersing groups with a substantially anionic charge, or other anionic components such as polymers or surfactants, where the anionic functionality is provided by carboxylate, phosphate, or similar chemical functional groups.

The inkjet inks can also include a solvent system and a surfactant system. As mentioned, these can be singular solvents and/or surfactants, or mixtures of multiple solvents and/or surfactants. Both of these systems, as well as other liquid components, are sometimes referred to as a "liquid vehicle," which refers to liquid mixture in which the pigment is dispersed to form an inkjet ink. Liquid vehicles generally are known in the art, and a wide variety of such vehicles may be used with the methods of the present invention. Such vehicles may include a mixture of a variety of different agents, in addition to the solvent system and the surfactant system, and can include anti-kogation agents, buffers, biocides, sequestering agents, viscosity modifiers, water, etc. Though not part of the liquid vehicle per se, in addition to the pigment, the vehicle can carry solid additives such as polymers, latexes, UV curable materials, plasticizers, etc.

As mentioned, the liquid vehicle formulations described herein can include water (40 wt % to 98 wt %). In one example, the liquid vehicle can be an aqueous liquid vehicle having a majority of water.

As mentioned, the liquid vehicle also includes a solvent system. The solvent system can include one or more organic solvent at a total concentration ranging from 0.1 wt % to 50 wt %, or in one example, from 5 wt % to 20 wt %. Classes of solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, pyrrolidinones, N-alkyl caprolactams, unsubstituted caprolactams, both substituted and unsubstituted formamides, both substituted and unsubstituted acetamides, and the like.

In one example, solvents can include the following: propylene glycol n-butyl ether; ethylene glycol n-butyl ether; 2,3-butanediol; 1,2-propanediol; propylene glycol; dipropylene glycol methyl ether; 1,2-butanediol; diethylene glycol methyl ether; ethylene glycol; 2-methyl-2,4-pentanediol (hexylene glycol); 2,4-pentanediol; n-methylpyrollidinone; n-ethylpyrollidinone; diethylene glycol ethyl ether; 1,3-butanediol; 3,5-dimethyl-3-hexyne-2,5-diol; 1,2-pentanediol; ethylene glycol n-hexyl ether; 2,2-dimethyl-1,3-propanediol; dipropylene glycol t-butyl ether; 2-methyl-1,3-propanediol (MPdiol); dipropylene glycol n-propyl ether; 1,3-propanediol; 2,5-dimethyl-2,5 hexanediol; 2,5-hexanediol; 1,2-hexanediol; 1,4-butanediol; dipropylene glycol n-butyl ether; diethylene glycol n-butyl ether; 2,2,4-trimethyl-1,3-pentanediol (TMPD glycol); 1,5-pentanediol; 2-ethyl-1,3-hexanediol; tripropylene glycol methyl ether; propylene glycol phenyl ether; ethylene glycol phenyl ether; di(ethylene glycol); di(propylene glycol); 2-pyrollidinone; 2-hydroxyethyl-2-pyrollidinone; triethylene glycol methyl ether; and mixtures thereof.

Regarding the surfactant system, one or more surfactant can be selected for use. The surfactant system can include one or more surfactant at a total concentration ranging from 0.1 wt % to 3 wt %, or in a more specific example, from 0.2 w % to 1.5 wt %, and in still a more specific example, from 0.4 wt % to 0.9 wt %. Furthermore, though not required, the inkjet inks described herein can include a unique surfactant mixture of a dynamic surfactant and a static surfactant which maintains a low ink surface tension and promotes increased and a more consistent ink dot gain when mixed with the analog pretreatment fluid. As previously mentioned, the pretreatment fluid can have a surface tension which is similar to or than the inkjet ink. Thus, surface tension of the analog pretreatment fluid can be maintained to be similar to or higher than the surface tension of the ink, so subsequent ink drops provide desirable dot gain based on surface tension difference gradient flow (Marangoni effect).

Exemplary surfactants that can be used include carboxylates, sulphonates, petroleum sulphonates, alkylbenzenesulphonates, naphthalenesulphonates, olefin sulphonates, alkyl sulphates, sulphates, sulphated natural oils and fats, sulphated esters, sulphated alkanolamides, alkylphenols, ethoxylated aliphatic alcohol, polyoxyethylene surfactants, carboxylic esters, polyethylene glycol esters, anhydrosorbitol esters, ethoxylated derivatives of anhydrosorbitol esters, glycol esters of fatty acids, carboxylic amides, monoalkanolamine condensates, polyoxyethylene fatty acid amides, quaternary ammonium salts, amines with amide linkages, polyoxyethylene alkyl and alicyclic amines, n,n,n',n' tetrakis substituted ethylenediamines, 2-alkyl 1-hydroxethyl 2-imidazolines, n-coco 3-aminopropionic acid/sodium salts, n-tallow 3-iminodipropionate disodium salt, n-carboxymethyl n dimethyl n-9 octadecenyl ammonium hydroxide, and 4.n-cocoamidethyl n hydroxyethylglycine sodium salt.

Regarding the selection of multiple surfactants for providing acceptable dot gain in accordance with examples of the present disclosure, there may be some surfactants that help significantly with maintaining dot gain consistency from layer of ink to layer of ink, and which assist in increasing dot gain at the same time, but such surfactants may introduce other problems. For example, Surfynol® SEF is a strong dynamic surfactant which can help increase dot gain as well as assist with maintaining a consistent dot gain from layer of ink to layer of ink, but it has limited solubility in many inks, e.g., less than 0.1 wt %. If more than 0.1 wt % is desirable for use, then it should be further solubilized. It has been recognized that the TegoWet® 510, for example, can be used in small amounts to maintain an acceptable solubility level of Surfynol® SEF in the ink, as well as prevent the Surfynol® SEF from oiling out when printed on the analog pretreatment fluid. Thus, the inkjet ink formulations of the present disclosure can include from 0.1 wt % to 0.5 wt % of a dynamic surfactant, and from 0.1 wt % to 0.5 wt % of a static surfactant. Alternatively, the total concentration of both the dynamic surfactant and the static surfactant can be from about 0.4 wt % to 0.9 wtT %. Furthermore, the weight ratio of dynamic to static surfactant can be from 2:1 to 1:2, or about 1:1.

In determining whether a surfactant is dynamic or static, surfactants can be tested to determine how long it takes for a solubilized surfactant to spread in water. If the surfactant spreads to the interface of the water at 0.1 second or less, it is considered to be a dynamic surfactant. If the surfactant spreads to the interface of the water in greater than 0.1 second, it is considered to be a static surfactant. Static surfactants tend to be more stable, and can be added at greater concentrations than the typically more insoluble dynamic surfactants. However, in inkjet printing, the use of only static surfactants can be problematic for very fast printing profiles. Thus, the introduction of dynamic surfactants in combination with static surfactants can be useful. Furthermore, as mentioned, there are several other benefits of using a mixture of dynamic and static surfactants. For example, some dynamic surfactants can oil out when printed on the analog pretreatment fluid when the pigment crashes with the salt. The use of a static surfactant in minor amounts with the dynamic surfactant can ameliorate this issue. Furthermore, in some systems, pigment floatation on the surface of the analog pretreatment fluid can be problematic, diminishing image quality. This too can be reduced using the multiple surfactants as described herein by example.

Because the latex film forming agent is present in the analog pretreatment fluid, there is not necessarily a need to include latex in the inkjet ink formulations. That being said, the use of latexes, though not typical, would not be precluded. If a latex is used, it can be similar to the latexes described above that are used in the analog pretreatment fluid, provided they are appropriately configured for inkjet printing.

Consistent with the formulation of this disclosure, various other additives may be employed to enhance the properties of the ink composition and/or fixer fluid composition for specific applications. Examples of these additives are those added to inhibit the growth of harmful microorganisms.

These additives may be biocides, fungicides, and other microbial agents, which are routinely used in ink formulations and fixer formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof. Viscosity modifiers and buffers may also be present, as well as other additives known to those skilled in the art to modify properties of the ink as desired. Such additives can be present at from 0 wt % to 20 wt %.

It is be noted that, as used in this specification and the appended claims, the singular forms "a," "an," and "the" include plural referents unless the context clearly dictates otherwise.

As used herein, a plurality of steps, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following examples illustrate some embodiments of the present analog pretreatment fluids, inkjet inks, and methods that are presently known. However, it is to be understood that the following are only exemplary or illustrative of the application of the principles of the present fluid sets and methods. Numerous modifications and alternative fluid sets and methods may be devised by those skilled in the art without departing from the spirit and scope of the present compositions and methods. The appended claims are intended to cover such modifications and arrangements. Thus, while the present fluid sets and methods have been described above with particularity, the following examples provide further detail in connection with what are presently deemed to be acceptable embodiments.

Example 1

Analog Pretreatment Fluids

Three analog pretreatment fluids were prepared according to Table 1, each including a latex, a calcium salt, surfactant, defoamer, preservative, and thickener. After preparation, these analog pretreatment fluids were applied wet to the surface of a gloss coated offset (Sterling Ultra Gloss) media sheet at a thickness of about 2 gsm wet fluid by an analog (non-digital) application process using rollers. It is noted that Analog Pretreatment Fluid 1 is referred to as PT1, Analog Pretreatment Fluid 2 as PT2, and Analog Pretreatment Fluid 3 as PT3.

TABLE 1

Analog Pretreatment Fluid Formulations

| Fluid Ingredients | Analog Pretreatment | | |
|---|---|---|---|
| | PT1 Wt % Solids | PT2 Wt % Solids | PT3 Wt % Solids |
| Lucidene 645 (latex) | 30 | 32 | 32 |
| Calcium Chloride, anhydrous | 5 | — | — |
| Calcium Nitrate, tetrahydrate | — | 10.6 | 10.6 |
| 2-Pyrrolidone | 3 | — | — |
| Byk-348 (surfactant) | 0.9 | 0.2 | 0.2 |
| Surfynol ® SEF (surfactant) | — | 0.3 | 0.4 |
| Byk-021 (defoamer) | 0.5 | — | — |
| Byk-012 (defoamer) | — | 0.3 | — |
| Dehydran 4210 (defoamer) | — | — | 0.3 |
| Proxel GXL (preservative) | 0.1 | 0.1 | 0.1 |
| Rheolate 212 (thickener) | 0.4 | 0.6 | 0.6 |
| Water | Balance | Balance | Balance |
| Viscosity, cps | 162 | 192 | 166 |
| Surface Tension, dynes/cm | 29.03 | 34.30 | 34.00 |
| pH | 6.97 | 7.32 | 6.77 |

It is noted that PT2 and PT3 had similar calcium ion present compared to PT1, even though the salt is different. Additionally, it is noted that the alternate defoamers of Byk-012 in PT2 and Dehydran 4210 in PT3, the lower amount of Byk-348 in PT2 and PT3 compared to PT1, and the additional Rheolate 212 in PT2 and PT3 compared to PT1 was used to achieve the relatively higher surface tension for PT2 and PT3 compared to PT1.

Example 2

Inkjet Inks

Fourteen inkjet inks were prepared as set forth in Tables 2 and 3 below. Specifically, seven Magenta inks were prepared (M1-M7) and seven Yellow inks were prepared (Y1-Y7). It is noted that there are only seven formulations shown in Tables 2 and 3, but by selecting either Magenta or Yellow pigment, as set forth in the tables, a total of 14 unique inkjet inks were prepared. For clarity, Magenta Ink 1 can be referred to as M1, Yellow Ink 1 can be referred to as Y1, Magenta Ink 4 can be referred to as M4, Yellow Ink 5 can be referred to as Y5, and so forth. Thus, Table 2 sets forth Inks 1-3 (M1-M3 and Y1-Y3), and Table 3 sets forth Inks 4-7 (M4-M7 and Y4-Y7), as follows:

TABLE 2

Inks 1-3 (M1-M3 and Y1-Y3)

| Ink Ingredients | Ink 1 Wt % Solids | Ink 2 Wt % Solids | Ink 3 Wt % Solids |
|---|---|---|---|
| Magenta (M) or Yellow (Y) Pigment | 3.5 (M) or 4.0 (Y) | 3.5 (M) or 4.0 (Y) | 3.5 (M) or 4.0 (Y) |
| 2-Pyrrolidone | 3 | 3 | 3 |
| 2HE2P | 6 | 6 | 6 |
| Surfynol ® SEF (dynamic surfactant) | 0.8 | 0.4 | 0.4 |

TABLE 2-continued

Inks 1-3 (M1-M3 and Y1-Y3)

| Ink Ingredients | Ink 1 Wt % Solids | Ink 2 Wt % Solids | Ink 3 Wt % Solids |
|---|---|---|---|
| TegoWet ® 510 (static surfactant) | — | 0.8 | 0.6 |
| Crodafos N3 acid | 0.5 | 0.5 | 0.5 |
| Proxel GXL (preservative) | 0.1 | 0.1 | 0.1 |
| Kordex MLX (preservative) | 0.14 | 0.14 | 0.14 |
| Water | Balance | Balance | Balance |
| Average Viscosity, cps | 1.7 | 1.6 | 1.7 |
| Average Surface Tension, dynes/cm | 30.14 | 30.18 | 30.64 |
| Average pH | 9.26 | 9.11 | 9.10 |

TABLE 3

Inks 4-7 (M4-M7 and Y4-Y7)

| Ink Ingredients | Ink 4 Wt % Solids | Ink 5 Wt % Solids | Ink 6 Wt % Solids | Ink 7 Wt % Solids |
|---|---|---|---|---|
| Magenta (M) or Yellow (Y) Pigment | 3.5 (M) or 4.0 (Y) | 3.5 (M) or 4.0 (Y) | 3.5 (M) or 4.0 (Y) | 3.5 (M) or 4.0 (Y) |
| 2-Pyrrolidone | 3 | 3 | 3 | 3 |
| 2-hydroxyethyl-2-pyrrolidone | 6 | 6 | 6 | 6 |
| Surfynol ® SEF (dynamic surfactant) | 0.3 | 0.3 | 0.3 | 0.3 |
| TegoWet ® 510 (static surfactant) | 0.8 | 0.6 | 0.4 | 0.3 |
| Crodafos N3 acid | 0.5 | 0.5 | 0.5 | 0.5 |
| Proxel GXL (preservative) | 0.1 | 0.1 | 0.1 | 0.1 |
| Kordex MLX (preservative) | 0.14 | 0.14 | 0.14 | 0.14 |
| Water | Balance | Balance | Balance | Balance |
| Average Viscosity, cps | 1.7 | 1.6 | 1.6 | 1.6 |
| Average Surface Tension, dynes/cm | 30.51 | 31.18 | 32.08 | 32.64 |
| Average pH | 9.11 | 9.13 | 9.13 | 9.12 |

It is noted that Surfynol® SEF (dynamic surfactant) was used as the lone surfactant in Ink 1 (M1 and Y1). By combining TegoWet® 510 (static surfactant) and Surfynol® SEF in Inks 3-7 (M2-M7 and Y2-Y7), the Surfynol® SEF stayed in solution to a greater degree when mixed with the analog pretreatment fluid, thus accounting for the increased dot gain set forth below in Table 4.

Example 3

Printing Data (% Dot Gain Difference and % Dot Gain Coverage Increase)

Various inks described in Tables 2 and 3 were printed wet-on-wet on media substrates coated with the various analog pretreatment fluids described in Table 1. Specifically, Magenta Inks (M) were printed on the Pretreatment Coatings (PT) at 10% area fill, and the percent coverage was measured based on spreading of the ink on the pretreatment fluid. This is referred to in Table 4 below as PT/M. Separately, 100% fill of Yellow Ink (Y) was printed on the Pretreatment Coatings (PT), and then subsequently while the Yellow Ink and the Pretreatment Coatings were still wet, a 10% area fill of the Magenta Ink (M) was printed over the Yellow Ink. The percent coverage due to spreading or dot gain of the Magenta Ink was then measured. This is referred to in Table 4 below as PT/Y/M. The goal was to provide the highest average percent coverage for both the PT/M and the PT/Y/M, as well as provide a percent coverage value was within 7% coverage (based on 100%), or even more desirably, within 5% coverage.

TABLE 4

Comparative Data

| Study | M Ink | Y Ink | Ink Surface Tension (dynes/cm) | PT Fluid | PT Surface Tension (dynes/cm) | PT/M | PT/Y/M | Diff. (%) | Ave. Size (%) |
|---|---|---|---|---|---|---|---|---|---|
| 1 | M1 | Y1 | 30.1 | PT2 | 34.30 | 33.0 | 27.0 | 6 | 30 |
| 2 | M2 | Y2 | 30.2 | PT2 | 34.30 | 30.6 | 23.7 | 6.9 | 27.15 |
| 3 | M3 | Y3 | 30.6 | PT2 | 34.30 | 30.0 | 23.7 | 6.3 | 26.85 |
| 4 | M4 | Y4 | 30.5 | PT2 | 34.30 | 37.0 | 23.5 | 13.5 | 30.25 |
| 5 | M5 | Y5 | 31.2 | PT2 | 34.30 | 33.3 | 26.9 | 6.1 | 30.1 |
| 6 | M6 | Y6 | 32.1 | PT2 | 34.30 | 34.1 | 24.0 | 10.1 | 29.05 |
| 7 | M7 | Y7 | 32.6 | PT2 | 34.30 | 30.1 | 28.3 | 1.8 | 29.2 |
| 8 | M1 | Y1 | 30.1 | PT1 | 29.03 | 28.6 | 25.9 | 2.7 | 27.25 |
| 9 | M2 | Y2 | 30.6 | PT1 | 29.03 | 35.6 | 24.7 | 10.9 | 30.15 |
| 10 | M6 | Y6 | 32.1 | PT1 | 29.03 | 30.2 | 26 | 4.2 | 28.1 |
| 11 | M7 | Y7 | 32.6 | PT1 | 29.03 | 31.3 | 25.9 | 5.4 | 28.6 |
| 12 | M2 | Y2 | 30.6 | PT3 | 34.00 | 34.5 | 23.2 | 11.3 | 28.85 |
| 13 | M6 | Y6 | 32.1 | PT3 | 34.00 | 34.2 | 27.3 | 6.9 | 30.75 |
| 14 | M7 | Y7 | 32.6 | PT3 | 34.00 | 31 | 27.7 | 3.3 | 29.35 |
| 15 | M1 | Y1 | 30.1 | PT1 | 29.03 | 28.6 | 25.9 | 2.7 | 27.25 |
| 16 | M7 | M7 | 32.6 | PT2 | 34.30 | 30.1 | 28.3 | 1.8 | 29.2 |
| 17 | M7 | M7 | 32.6 | PT3 | 34.00 | 31.0 | 27.7 | 3.3 | 29.35 |

As can be seen in the set 17 studies provided in Table 4, various Pretreatment and Ink combinations provided acceptable results. Specifically, with the goal of having an average dot size after spreading to be at least 28% coverage (based on a 10% fill coverage printed dot size), and a difference in dot size of 7% or less, several fluid sets met this goal. Specifically, the fluid sets described in Studies 1, 5, 7, 10, 11, 13, 14, 16, and 17 met both of these goals. Fluid sets that had a difference in dot size of less than 5% under the same 28% coverage standard included the fluid sets described in Study 7, 10, 14, 16, and 17. For the very best results, fluid sets that had a difference in dot size of less than 5% and an average coverage size of at least 29% included the fluid sets described in Study 7, 14, 16, and 17. For this last subset of Studies, these fluid sets were all produced using Ink 7 (M7 and Y7) on either Pretreatment Fluid 2 or 3 (PT2 or PT3). This particular ink set (M7 and Y7) had a relatively low concentration of a 1:1 weight ratio of dynamic surfactant to static surfactant. Furthermore, M7 and Y7 inks had a lower surface tension than both the PT2 and PT3 pretreatment fluids.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A fluid set for printing, comprising:
    an analog pretreatment fluid comprising water, latex, and a salt, the analog pretreatment fluid having a surface tension from 28 dynes/cm to 40 dynes/cm;
    a first inkjet ink comprising water, a first pigment, a first solvent system, and a first surfactant system, the first inkjet ink having a surface tension ranging from 2 dynes/cm greater than the surface tension of the analog pretreatment fluid to 6 dynes/cm less than the surface tension of the analog pretreatment fluid; and
    a second inkjet ink comprising water, a second pigment, a second solvent system, and a second surfactant system, the second inkjet ink having a surface tension ranging from 2 dynes/cm greater than the surface tension of the analog pretreatment fluid to 6 dynes/cm less than the surface tension of the analog pretreatment fluid;
    wherein the first surfactant system and second surfactant system are present in the first inkjet ink and the second inkjet ink, individually, at from 0.4 wt % to 0.9 wt %, and wherein each surfactant system includes dynamic surfactant and a static surfactant at a weight ratio of 1:2 to 2:1.

2. The fluid set of claim 1, wherein the analog pretreatment fluid has a surface tension from 32 dynes/cm to 40 dynes/cm, and wherein the first inkjet and the second inkjet ink both have a surface tension ranging from 2 to 6 dynes/cm less than the surface tension of the analog pretreatment fluid.

3. The fluid set of claim 1, wherein analog pretreatment fluid has a viscosity from 100 to 300 cps.

4. The fluid set of claim 1, wherein the first pigment and the second pigment are independently a self-dispersed pigment, a pigment dispersed with an anionic surfactant, or a pigment dispersed with an anionic polymer.

5. The fluid set of claim 1, wherein the first inkjet ink and the second inkjet ink are devoid of latex.

6. The fluid set of claim 1, wherein the first solvent system and the second solvent system each include at least one of 2-pyrollidinone and 2-hydroxyethyl-2-pyrrolidone.

7. The fluid set of claim 1, the first solvent system and the second solvent system each include multiple identical solvents, and the first surfactant system and the second surfactant system each include multiple identical surfactants.

8. The fluid set of claim 1, wherein the latex in the analog pretreatment fluid includes a urethane polymer, a polyurethane polymer, an acrylic-polyurethane polymer, a hybrid latex polymer, or mixtures thereof.

9. The fluid set of claim 1, wherein the salt in the analog pretreatment fluid includes calcium chloride, calcium nitrate, calcium acetate, calcium propionate, magnesium sulfate, magnesium nitrate, magnesium acetate, or mixtures thereof.

10. The fluid set of claim 1, wherein upon digitally inkjet printing the first inkjet ink at a 10% area fill on the analog pretreatment fluid to generate a first sample, and upon printing the second inkjet ink on the analog pretreatment fluid at a 100% area fill, then digitally printing the first inkjet ink at a 10% area fill on the second inkjet ink to generate a second sample, the percent coverage of the first inkjet ink on the first sample and the percent coverage of the first inkjet ink on the second sample are both at least 28%, having a difference of less than 7% coverage between the percent coverage of the first inkjet ink on the first sample and the percent coverage of the first inkjet ink on the second sample.

11. The fluid set of claim 10, wherein the dot gain of the first inkjet ink on the first sample and the dot gain of the first inkjet ink on the second sample has a difference in dot size of less than 5% coverage.

12. The fluid set of claim 1, wherein the water is present in the analog pretreatment fluid in an amount from 40 wt % to 60 wt %.

13. The fluid set of claim 1, wherein the latex is present in the analog pretreatment fluid in an amount from 20 wt % to 50 wt % and wherein the salt is present in the analog pretreatment fluid in an amount from 3 wt % to 20 wt %.

14. A method of wet-on-wet printing, comprising:
    applying an analog pretreatment fluid to a media substrate by a method other than digital inkjet printing to form a coated media sheet, wherein the analog pretreatment fluid has a surface tension from 32 dynes/cm to 40 dynes/cm;
    digitally inkjet printing a first inkjet ink on the coated media sheet while the pretreatment fluid is still wet, wherein the first inkjet ink has a surface tension ranging from 2 dynes/cm greater than the surface tension of the analog pretreatment fluid to 6 dynes/cm less than the surface tension of the analog pretreatment fluid, wherein the first inkjet jet comprises a first surfactant system; and
    digitally inkjet printing a second inkjet ink on the first inkjet ink while the analog pretreatment fluid and the first inkjet ink are still wet, the second inkjet ink having a surface tension ranging from 2 dynes/cm greater than the surface tension of the analog pretreatment fluid to 6 dynes/cm less than the surface tension of the analog pretreatment fluid, wherein the second inkjet jet comprises a second surfactant system;
    wherein the first surfactant system and second surfactant system are present in the first inkjet ink and the second inkjet ink, individually, at from 0.4 wt % to 0.9 wt %, and wherein each surfactant system includes dynamic surfactant and a static surfactant at a weight ratio of 1:2 to 2:1.

15. The method of claim 14, wherein analog pretreatment fluid has a viscosity from 100 to 300 cps and is applied to the media substrate by roller, sprayer, curtain, blade, or slot die.

16. The method of claim 14, wherein the media substrate is high hold out media; the analog pretreatment fluid comprises water, latex, and a salt; and the first inkjet ink and the second inkjet ink each comprise water, a pigment, a solvent system, and a surfactant system.

17. The method of claim 14, wherein the analog pretreatment fluid comprises a latex including a urethane polymer, a polyurethane polymer, an acrylic-polyurethane polymer, a hybrid latex polymer, or mixtures thereof.

18. The method of claim 14, wherein the analog pretreatment fluid comprises a salt including calcium chloride, calcium nitrate, calcium acetate, calcium propionate, magnesium sulfate, magnesium nitrate, magnesium acetate, or mixtures thereof.

19. The method of claim 14, wherein the first inkjet ink and the second inkjet ink are devoid of latex.

20. The method of claim 14, wherein the first inkjet ink comprises a first pigment and the second inkjet ink comprises a second pigment, wherein the first pigment and the second pigment are independently a self-dispersed pigment, a pigment dispersed with an anionic surfactant, or a pigment dispersed with an anionic polymer.

* * * * *